April 11, 1944. W. H. ALLEN 2,346,128
TURBOSUPERCHARGER
Filed Sept. 28, 1942 2 Sheets-Sheet 1
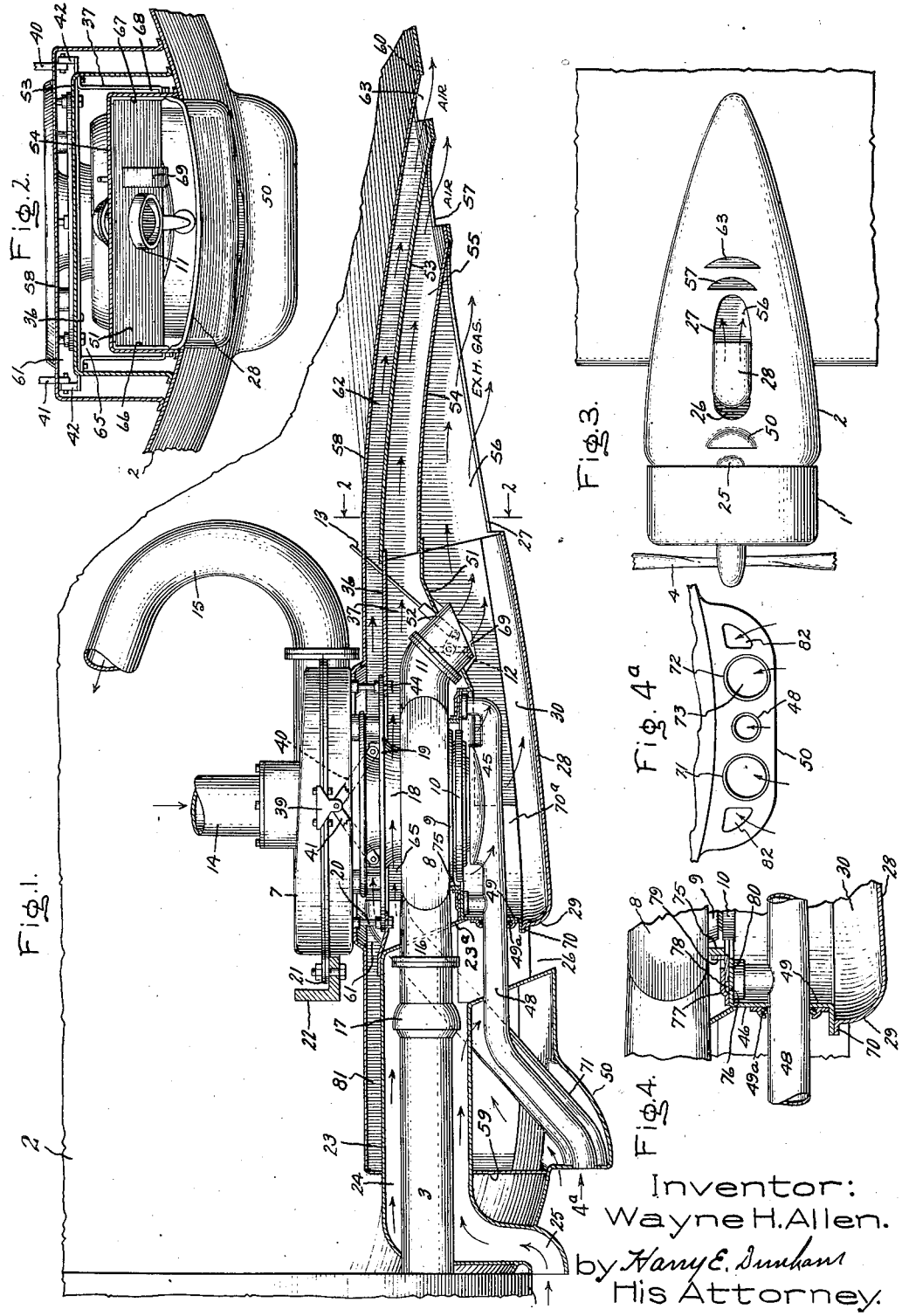
Inventor:
Wayne H. Allen.
by Harry E. Dunham
His Attorney.

Inventor:
Wayne H. Allen,
by Harry E. Dunham
His Attorney.

Patented Apr. 11, 1944

2,346,128

UNITED STATES PATENT OFFICE 2,346,128

TURBOSUPERCHARGER

Wayne H. Allen, Eagle Rock, Calif., assignor to General Electric Company, a corporation of New York Application September 28, 1942, Serial No. 459,912

6 Claims. (Cl. 60—41)

The present invention relates to turbosuperchargers, especially turbosuperchargers for aircraft, and has for its object to provide an improved construction and arrangement for such apparatus. More particularly, the invention has to do with the arrangement of the supercharger on the aircraft and the arrangement for cooling it.

For a consideration of what I believe to be novel and my invention, attention is directed to the following specification and the claims appended thereto.

Figure 5:
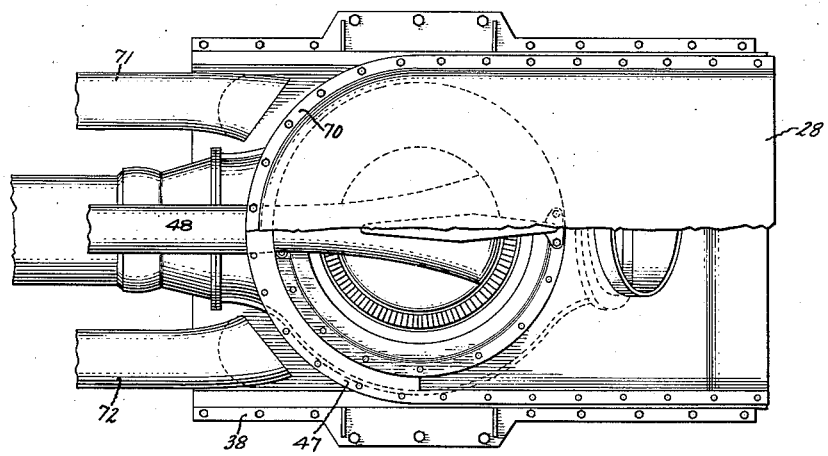
Figure 6:
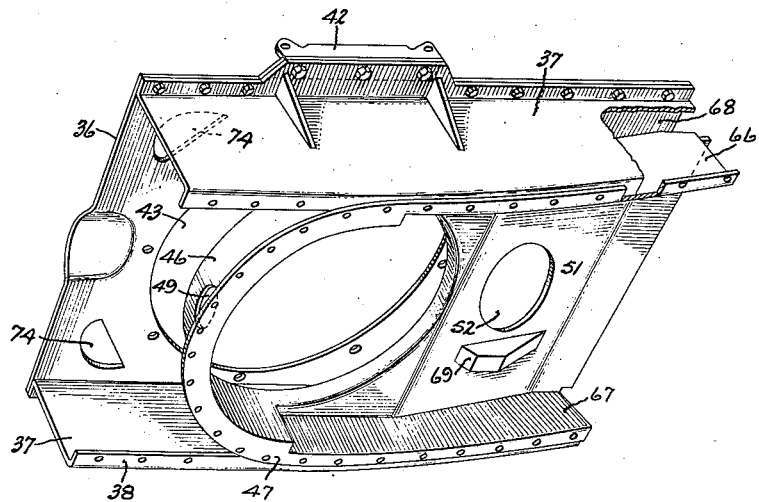

In the drawings, Fig. 1 shows a part of an aircraft having a turbosupercharger installation embodying my invention; Fig. 2 is a sectional view taken on line 2—2, Fig. 1; Fig. 3 is a bottom plan view on a smaller scale; Fig. 4 is a detail view, on a larger scale, of certain parts; Fig. 5 is a bottom plan view of the structure shown in Fig. 1, parts being broken away to better show the construction; Fig. 6 is a detail perspective view of a part of a casing structure, and Fig. 4ª is a detail view looking in the direction of the arrow 4ª, Fig. 1.

Referring to the drawings, 1 indicates the forward part of an aircraft nacelle in which an engine is located and 2 indicates a rearward portion thereof. The engine is not shown. The exhaust conduit of the engine is indicated at 3. The engine drives an aircraft propeller 4. The turbosupercharger comprises a compressor 7 and a gas turbine comprising a nozzle box 8, a nozzle ring 9, a turbine wheel 10, and a waste gate conduit 11, the latter being provided with a waste gate regulating valve 12 positioned by a suitable control rod 13. Air is supplied to compressor 7 through a conduit 14 the end of which may face into the slip stream. Air is discharged from the compressor through a conduit 15 which leads to the aircraft engine intake manifold or other point of consumption. Exhaust conduit 3 is connected to nozzle box inlet conduit 16, the connection comprising a suitable flexible universal joint 17 arranged to permit relative movement between conduits 3 and 16. The compressor casing and the nozzle box are connected together through the intermediary of a housing 18 in which is located the bearing structure for the shaft which carries the compressor impeller and the turbine wheel, and the oil pump or pumps, a flange 19 on housing 18 being attached to the compressor housing by suitable bolts or shoulder studs 20. The compressor casing and the gas turbine are thus connected together to form a unitary structure. The supercharger structure is mounted in the nacelle by means of a plurality of circumferentially spaced ears 21 carried by the flange on the compressor casing which ears rest on and are bolted to struts 22 which form a part of the nacelle structure. By way of example, only one of the ears 21 and its supporting strut 22 is shown. A plurality of such ears, for example three or four, may be used. The turbosupercharger may be arranged with its shaft horizontal, vertical, or at any desired angle. In the illustrated arrangement, the turbosupercharger is supported inside the nacelle with its shaft extending transversely thereof, the supercharger hanging downward, so-to-speak, on the supports 22.

The turbosupercharger structure described is shown only in outline. The structure indicated is a known one and is to be taken as typical of any suitable turbosupercharger. My invention has to do particularly with its arrangement in the nacelle and the arrangement for cooling it.

Surrounding exhaust conduit 3 and joint 17 in spaced relation thereto are walls 23 which define a cooling chamber 24. Connected with the forward end of chamber 24 is a scoop 25 which faces into the slip stream and takes air from the slip stream and directs it through chamber 24, the air discharging through an opening 26. This serves to cool the exhaust conduit and also to carry away any gases which may leak out through flexible universal joint 17. An end wall 23ª serves to direct cooling air from chamber 24 to opening 26.

In wall 2 in axial alignment with the turbosupercharger is a relatively large opening 27 the forward portion of which is covered by an open-sided box-like structure comprising an outer wall 28, a front wall 29, and side walls 30.

Surrounding the gas turbine structure is a casing comprising, as viewed in Figs. 1 and 6, a top wall 36 and side walls 37, the side walls being provided with lower inturned flanges 38. This casing is supported on the flange of compressor 7 by means of ears 39 on diametrically opposite sides of the compressor casing to which are attached pairs of links 40 and 41 which at their lower ends are attached to flanges 42 on opposite sides of the structure. In Fig. 1, 40 indicates the links on the far side of the compressor casing and 41 indicates the links on the near side of the compressor casing, the links 41 being broken away inasmuch as the section in Fig. 1 is taken through the center of the casing. Casing wall 36 has an opening 43 through which the gas turbine projects. Adjacent to the opening, wall 36 is fastened to flange 19 by shoulder studs 20 as is indicated at 44.

In front of the turbine wheel (beneath it as shown in Fig. 1) is a cooling cap 45 through which air circulates and from which air is discharged against the turbine wheel to cool the wheel. It and the turbine wheel are housed in a casing defined by a surrounding wall 46 having flanges 47 which overlie flanges 38 and are attached thereto. Air is conveyed to the cooling cap by a conduit 48 which projects through an opening 49 in wall 46, there being a suitable packing 49a between conduit 48 and the wall which prevents extraneous air from flowing therethrough Conduit 48 has its open end fixed in a wall 50 and facing into the slip stream. At 51 is a sloping wall which connects together the side portions of wall 46 and is provided with an opening 52 for the passage of conduit 11. At 53 and 54 (Fig. 1) are walls which form extensions of walls 36 and 51, respectively, and serve to define passages 55 and 56. Passage 55 leads to an opening 57 in wall 2, and passage 56 leads to the rearward portion of opening 27. Walls 53 and 54 may be U-shaped in section as shown in Fig. 2 and at their extremities are suitably attached to wall 2.

Located above walls 36 and 53 is a wall 58 which at its forward end is attached to an end wall 59 and at its rearward end is attached to wall 2, as is indicated at 60. Wall 58 may be U-shaped in section, its extremities being attached to wall 2. It defines with walls 36 and 53 a cooling air chamber 61 which surrounds a part of the supercharger bearing and a passage 62 which connects chamber 61 with a discharge opening 63 in wall 2.

In the present instance, exit openings 57 and 63 are shown as separate being divided by a cross wall. However, the cross wall may be omitted. Wall 36, side walls 37, and walls 23a and 59 define a chamber 65 in which nozzle box 8 is housed, which chamber is in communication with passages 55.

The side wall portions 66 and 67 of wall 46 are spaced from side walls 37 to provide passages 68 which communicate at their forward ends with passages 55 and 56.

In wall 51 is a depression 69 to accommodate movement of the inner end of rod 13 and the arm on the spindle of valve 12.

The box-like structure comprising walls 28, 29 and 30 is provided with a flange 70 which is suitably attached to flanges 47 and 38, and it forms with walls 46 and 51 a turbine wheel exhaust chamber 70a which connects with passage 56. In other words, these walls form an exhaust hood for the turbine wheel.

Cooling air is supplied to chambers 61 and 65 by conduits 71 and 72 which at one end face into the slip stream as is indicated at 73 and at the other end project partly through openings 74 in wall 36 so as to discharge air to both chambers.

The exhaust hood for the turbine wheel is connected to the nozzle box of the turbosupercharger by a flexible connection which provides for both axial and radial displacement of the exhaust hood with respect to the turbosupercharger. This is shown particularly in the enlarged section, Fig. 4. Surrounding nozzle ring 9 is an axially extending flange 75 which is suitably attached to the nozzle box and carried by the exhaust hood are radially extending annular walls 76 and 77 which are spaced apart to form an annular groove 78. Located between flange 75 and walls 76 and 77 is an annular sealing ring which is L-shaped in section, one wall 79 of the sealing ring having an axially sliding fit with flange 75 and the other wall 80 of the sealing ring having a radially sliding fit in groove 78. With this arrangement, the exhaust hood and turbosupercharger are free to adjust themselves relatively to each other both axially and radially.

As shown in Fig. 1, wall 58 which is U-shaped in section extends well forward, end wall 59 being shown in the present instance as being in substantially vertical alignment with the forward end of wall 50. Thus there is provided a chamber 81 which surrounds walls 23. Cooling air is supplied to chamber 81 through openings 82 in wall 50 (see Fig. 4a). From chamber 81 cooling air flows across the side walls of the nozzle box on each side of wall 23a and across the side walls of the exhaust chamber, discharging through passages 68 and 65.

With the above arrangement, exhaust gases from the turbine wheel are discharged to chamber 70a whence they flow through passage 56, discharging through opening 27 in a generally rearward direction as is indicated by the arrows. Cooling air flows through chambers 37 and 61, thence out through passages 55 and 62 to discharge openings 57 and 63, the general paths of flow being indicated by arrows. Chambers 37 and 61 surround exhaust gas chamber 70, and the cooling air flowing through them serves to cool the gases before they discharge to atmosphere and also to confine the heat of the gases. Openings 57 and 63 are located beyond (i. e., to the rear of) exhaust gas discharge opening 27 but adjacent it whereby the air discharged through openings 57 and 63 forms layers of air flowing across the outer surface of the nacelle wall, protecting it from contact with the hot exhaust gases. The cooling air serves to cool the supercharger bearing, the nozzle box and adjacent parts. The air flowing through chamber 24 serves to cool exhaust conduit 3 and to carry away any exhaust gases leaking from flexible universal joint 17. Also, this air flows along and serves to cool walls 23a, 46 and 29.

The arrangement serves to cool effectively the walls forming the nozzle box and the exhaust hood and to carry away quantities of heat from the exhaust gases, a portion of such cooling being effected by cooling air flowing out through discharge opening 26, as pointed out above, and additional cooling being effected by cooling air from cooling chamber 81 flowing along the sides of the nozzle box and exhaust hood.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with an aircraft nacelle having an opening in a wall thereof, of a turbosupercharger mounted in the nacelle above the opening, walls defining within the nacelle an exhaust chamber for the turbosupercharger, and a cooling chamber for parts of the turbosupercharger, a conduit for conveying cooling air to the cooling chamber, and walls defining passages for conducting the cooling air and the exhaust gases to the outside of the nacelle, the exit opening in the nacelle for the cooling air passage being located to the rear of that for the exhaust gases as regards the direction of flight whereby the discharged air serves to protect the surface of the nacelle from the exhaust gases.

2. The combination with an aircraft nacelle having an opening in a wall thereof, of a turbosupercharger mounted in the nacelle above the opening, walls defining within the nacelle an exhaust chamber for the turbosupercharger, and a plurality of cooling chambers, one above another, for the turbosupercharger, conduit means for conveying cooling air to said cooling chambers, walls defining passages, one above another, connecting the cooling chambers to outside the nacelle, means for effecting flow of cooling air through said chambers and passages, walls defining an exhaust chamber for the turbosupercharger, and walls defining a passage connecting the exhaust chamber to outside the nacelle, the exit openings of said cooling air passages being to the rear of that for the exhaust gas passage as regards the direction of flight.

3. The combination with an aircraft nacelle having an opening in a wall thereof, of a turbosupercharger mounted in the nacelle above the opening, walls defining within the nacelle an exhaust chamber for the turbosupercharger, and a cooling chamber for parts of the turbosupercharger, a conduit for conveying cooling air to the cooling chamber, and walls defining passages for conducting the cooling air and the exhaust gases to the outside of the nacelle, the exit opening in the nacelle for the cooling air passage being located to the rear of that for the exhaust gases as regards the direction of flight whereby the discharged air serves to protect the surface of the nacelle from the exhaust gases, a conduit having an adjustable joint connecting the aircraft engine exhaust to the turbosupercharger, walls forming a chamber which houses said conduit and joint, and means for conveying cooling air through said last-named chamber.

4. The combination with an aircraft nacelle, of a turbosupercharger mounted in the nacelle, an exhaust hood for the turbosupercharger, means forming an axially and radially adjustable joint between the turbosupercharger and the hood, and walls defining passages, one above another, through which cooling air and exhaust gases are conveyed to the outside of the nacelle.

5. In an aircraft, a nacelle, a turbosupercharger mounted in the nacelle, a conduit for conveying gases to the supercharger, walls defining a cooling chamber surrounding said conduit, walls defining an exhaust hood for the supercharger, means forming an axially and radially adjustable connection between the exhaust hood and the turbosupercharger casing, and means for effecting flow of cooling medium through said cooling chamber and across a wall of said hood.

6. In an aircraft, a nacelle, a turbosupercharger mounted in the nacelle comprising an intermediate bearing housing, a compressor casing on one side thereof and a nozzle box on the other side thereof, walls defining an exhaust hood for the turbosupercharger, and walls defining passages for conveying cooling air over said bearing housing and over said exhaust hood, said nacelle having discharge openings for exhaust gases and for cooling air, the gas discharge opening being in advance of the cooling air discharge opening as regards the direction of flow of the aircraft slip stream.

WAYNE H. ALLEN.